(No Model.)
D. M. KYLE.
LAWN MOWER.
No. 587,005. Patented July 27, 1897.
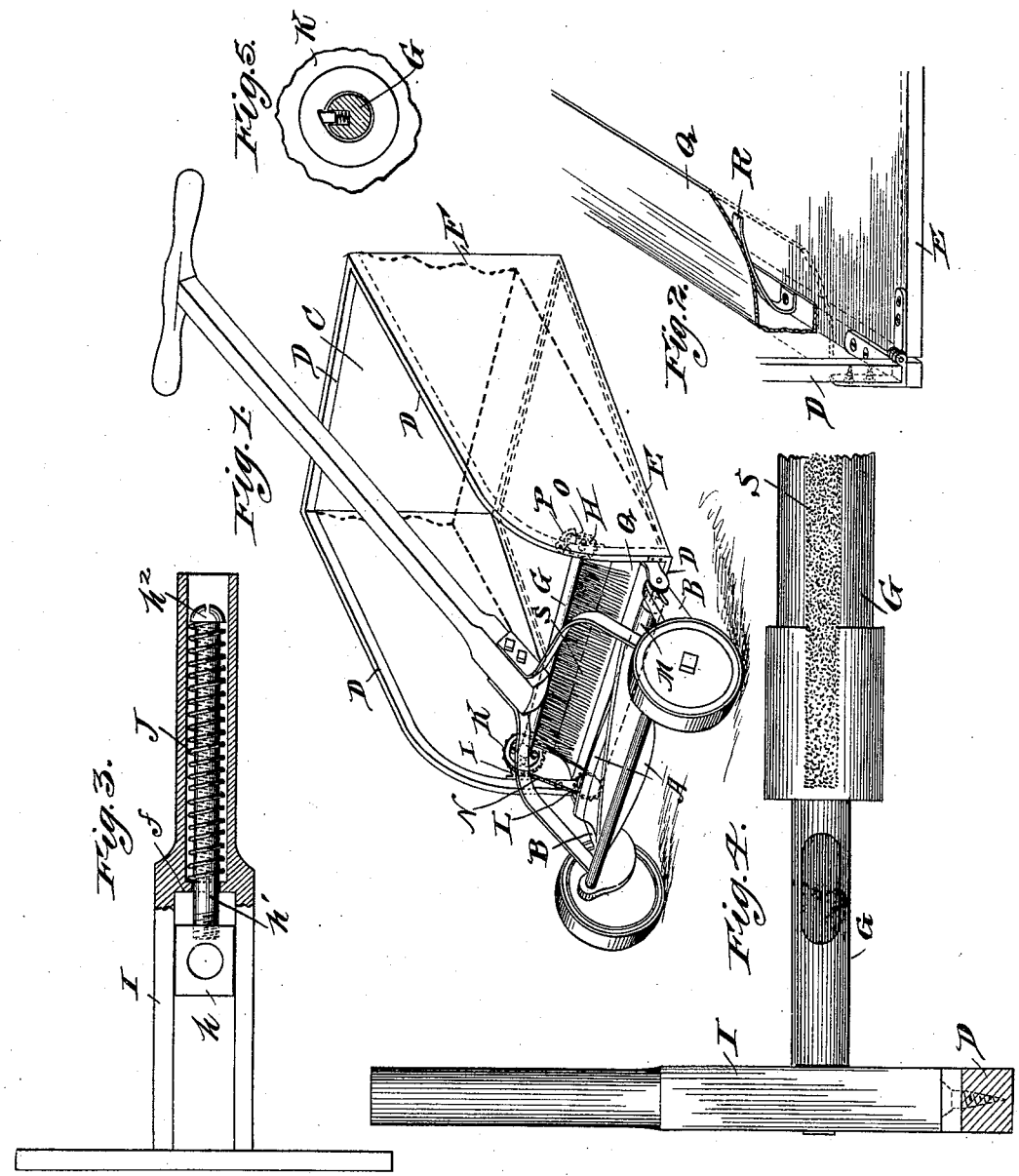
Witnesses,
Inventor,
David M. Kyle
By Offield Towle & Linthicum
Attys

UNITED STATES PATENT OFFICE.

DAVID M. KYLE, OF CHICAGO, ILLINOIS.

LAWN-MOWER.

SPECIFICATION forming part of Letters Patent No. 587,005, dated July 27, 1897.

Application filed June 26, 1894. Serial No. 515,769. (No model.)

*To all whom it may concern:*

Be it known that I, DAVID M. KYLE, of Chicago, Illinois, have invented certain new and useful Improvements in Lawn-Mowers, of which the following is a specification.

This invention relates to lawn-mowers having receptacles to receive cut grass; and the features of invention are a box having flexible sides and back and a hinged bottom, a tension device for keeping the driving-chain taut in all positions of the push-pole, a shield or plate upon which the cut grass is deposited, and a rotatable brush to remove the cut grass from the shield or plate.

In the accompanying drawings, Figure 1 is a perspective view of a lawn-mower with my improvements applied thereto. Fig. 2 is a broken perspective showing the manner of securing the hinged bottom and plate to the frame of the box. Fig. 3 is a side elevation, partly in section, of a bracket with a slidable box thereon to receive one end of the brush-shaft. Fig. 4 is a plan view of the bracket and one end of the brush-shaft. Fig. 5 is a detail view of the shaft and sprocket-wheel hub.

In the drawings, A represents the cutting-knives, which are operated in the usual manner, and B lugs to which the box C is pivotally secured.

The box consists of a frame D, a hinged bottom E, and flexible sides and back F, connecting the frame and bottom. Shaft G has one end loosely secured to the frame D, as shown at H, and the opposite end is journaled in a box $h$, slidably mounted in the bracket I. Journal-box $h$ has a rod $h'$ secured therewith and projecting through a wall $f$ of the bracket I. A coiled spring $j$ surrounds rod $h'$, one end of which spring bears against the wall $f$ and the other end against the head $h^2$ of the rod $h'$, normally keeping the box $h$ drawn back to the wall $f$. Sprocket-wheel K on shaft G has a spring-seated key, Fig. 5, and is connected with sprocket L on ground-roller M by chain N. In a backward movement of the mower the brush-shaft will not rotate, but sprocket-wheel K will revolve upon the shaft and the ratchet O and pawl P will lock the shaft against rotation until the machine is moved forward. Plate Q is secured to the front of the frame and is held up by the spring R. The cut grass is deposited upon the plate Q and grass is allowed to accumulate thereon until the shaft G has completed a revolution, when the brush S on shaft G will wipe over the plate Q and cast the grass to the back of the receptacle.

In operation the sliding and spring-controlled journal-box will be held in position to keep the driven chain taut. The hinged receptacle will conform to irregularities of the surface passed over and the rotating brush will be operated with a small expenditure of power to keep the cut grass thrown back into the receptacle.

Without limiting myself to precise details of construction, I claim—

In combination a lawn-mower, a box pivotally secured therewith, a plate secured to the box, a spring beneath the plate whereby to upwardly thrust said plate and a rotatable brush whereby to remove the cut grass from the plate, substantially as described.

DAVID M. KYLE.

Witnesses:
S. T. MANN,
N. M. BOND.